(12) United States Patent
Curran et al.

(10) Patent No.: US 12,451,720 B2
(45) Date of Patent: Oct. 21, 2025

(54) HYBRID CAPACITOR ENERGY STORAGE

(71) Applicant: Richardson Electronics, Ltd., LaFox, IL (US)

(72) Inventors: John Raymond Curran, LaFox, IL (US); Brian Christopher Gumino, LaFox, IL (US)

(73) Assignee: Richardson Electronics, Ltd., LaFox, IL (US)

( * ) Notice: Subject to any disclaimer, the term of this patent is extended or adjusted under 35 U.S.C. 154(b) by 0 days.

(21) Appl. No.: 18/315,133

(22) Filed: May 10, 2023

(65) Prior Publication Data

US 2024/0380236 A1  Nov. 14, 2024

(51) Int. Cl.
| | |
|---|---|
| *H02J 7/34* | (2006.01) |
| *H01G 11/06* | (2013.01) |
| *H01G 11/10* | (2013.01) |
| *H02J 7/00* | (2006.01) |
| *H02M 1/42* | (2007.01) |
| *H02M 3/335* | (2006.01) |
| *H02M 7/5387* | (2007.01) |
| *H05K 7/20* | (2006.01) |

(52) U.S. Cl.
CPC .............. *H02J 7/345* (2013.01); *H01G 11/06* (2013.01); *H01G 11/10* (2013.01); *H02J 7/0013* (2013.01); *H02J 7/0029* (2013.01); *H02M 1/4208* (2013.01); *H02M 3/33569* (2013.01); *H05K 7/20909* (2013.01); *H02J 2207/20* (2020.01); *H02J 2207/50* (2020.01); *H02M 7/53871* (2013.01)

(58) Field of Classification Search
CPC ........................................................ H02J 7/345
See application file for complete search history.

(56) References Cited

U.S. PATENT DOCUMENTS

| | | | | |
|---|---|---|---|---|
| 5,808,252 A | * | 9/1998 | Makuc | H01H 9/282 200/50.01 |
| 6,049,177 A | * | 4/2000 | Felper | H05B 41/2821 315/307 |
| 2005/0134230 A1 | * | 6/2005 | Sato | H01M 10/486 320/136 |
| 2007/0047100 A1 | * | 3/2007 | Takahashi | H02J 9/061 359/689 |
| 2011/0090633 A1 | * | 4/2011 | Rabinovitz | G06F 1/184 361/679.31 |
| 2012/0161715 A1 | * | 6/2012 | Park | H02J 7/0016 320/136 |
| 2016/0006299 A1 | * | 1/2016 | Myhre | H02M 3/04 307/66 |
| 2018/0095442 A1 | * | 4/2018 | Ueda | G06F 11/14 |
| 2018/0145377 A1 | * | 5/2018 | Zheng | H02J 7/00306 |
| 2018/0366791 A1 | * | 12/2018 | Kondo | H02J 7/0031 |
| 2020/0126874 A1 | * | 4/2020 | Bahl | H01L 22/20 |
| 2022/0209546 A1 | * | 6/2022 | Hall | B60L 53/60 |

(Continued)

*Primary Examiner* — Tynese V McDaniel
(74) *Attorney, Agent, or Firm* — Erise IP, P.A.

(57) ABSTRACT

Systems, methods, and devices including a plurality of hybrid capacitors for storing energy as both electrical potential and chemical potential. An energy storage bank comprising the plurality of hybrid capacitors is coupled to a battery management system configured to monitor parameters of the plurality of hybrid capacitors and selectively access at least a portion of the plurality of hybrid capacitors to provide electrical power output.

20 Claims, 6 Drawing Sheets

(56) References Cited

U.S. PATENT DOCUMENTS

| | | | |
|---|---|---|---|
| 2022/0246363 A1* | 8/2022 | Losic | H01G 11/06 |
| 2022/0247203 A1* | 8/2022 | Ghadami | H02J 7/00712 |
| 2023/0020139 A1* | 1/2023 | Yamane | H02M 7/003 |
| 2023/0251320 A1* | 8/2023 | Kwon | H02J 7/0047 |

* cited by examiner

HYBRID CAPACITOR ENERGY STORAGE

BACKGROUND

1. Field

Embodiments of the invention relate to an energy storage system. More specifically, embodiments of the invention relate to an energy storage system including hybrid capacitors.

2. Related Art

Capacitors have been used as an alternative energy storage device in place of or in combination with traditional batteries. Capacitors have quicker charging and discharging times, operability for a wider range of temperatures, and are suitable for significantly more charging cycles when compared with batteries. However, existing capacitor energy storage systems are also associated with a number of drawbacks. For example, typical capacitor-based energy storage systems have a relatively low energy density, a high self-discharge, and require close monitoring and load balancing. Accordingly, hybrid capacitors may be used, which exhibit qualities of both capacitors and batteries. Said hybrid capacitors utilize electromagnetic storage in addition to chemical storage.

SUMMARY

Embodiments of the invention solve the above-mentioned problems by providing systems and devices including a plurality of hybrid capacitors for storing energy as both electrostatic potential and electrochemical potential to thereby provide advantages from each respective energy storage technique. An energy storage bank comprising the plurality of hybrid capacitors is coupled to a battery management system configured to monitor parameters of the plurality of hybrid capacitors and selectively access at least a portion of the plurality of hybrid capacitors to provide electrical power output.

In some aspects, the techniques described herein relate to an energy storage system including: an energy storage system housing; a plurality of lithium-ion hybrid ultracapacitors disposed in the energy storage system housing; a battery management system disposed on or in the energy storage system housing and coupled to the plurality of lithium-ion hybrid ultracapacitors and operable to selectively access a portion of the plurality of lithium-ion hybrid ultracapacitors based at least in part on a measured parameter of the plurality of lithium-ion hybrid ultracapacitors; and a charger electrically coupled to the plurality of lithium-ion hybrid ultracapacitors to thereby charge the plurality of lithium-ion hybrid ultracapacitors.

In some aspects, the techniques described herein relate to an energy storage system, further including: a power factor correction component that converts alternating current power to direct current power within the energy storage system.

In some aspects, the techniques described herein relate to an energy storage system, wherein the charger includes a flyback converter, the energy storage system further including: a first thermal switch coupled to the flyback converter; and a second thermal switch coupled to the power factor correction component.

In some aspects, the techniques described herein relate to an energy storage system, further including: a metal oxide varistor that limits a surge voltage at an electrical input of the power factor correction component.

In some aspects, the techniques described herein relate to an energy storage system, further including: one or more printed circuit boards disposed within the energy storage system housing coupled to the plurality of lithium-ion hybrid ultracapacitors, wherein each of the plurality of lithium-ion hybrid ultracapacitors is soldered to the one or more printed circuit boards.

In some aspects, the techniques described herein relate to an energy storage system, wherein the plurality of lithium-ion hybrid ultracapacitors includes seventeen lithium-ion hybrid ultracapacitor cells electrically connected in series, each lithium-ion hybrid ultracapacitor cell of the seventeen lithium-ion hybrid ultracapacitor cells including a string of four lithium-ion hybrid ultracapacitors electrically connected in parallel.

In some aspects, the techniques described herein relate to an energy storage system, further including: one or more fans disposed on the energy storage system housing that provide cooling to an internal portion of the energy storage system.

In some aspects, the techniques described herein relate to an energy storage system, further including: at least one electrical breaker permitting low voltage operation of the energy storage system.

In some aspects, the techniques described herein relate to an energy storage system, further including: an emergency stop system configured to selectively disconnect electrical power of the energy storage system in response to a manual operator input.

In some aspects, the techniques described herein relate to an energy storage system, wherein the emergency stop system includes: an emergency stop circuit; one or more cover interlocks disposed in the emergency stop circuit; and one or more cable interlocks disposed in the emergency stop circuit.

In some aspects, the techniques described herein relate to an energy storage bank including: a plurality of energy storage cells electrically connected in series, each energy storage cell of the plurality of energy storage cells including: a plurality of lithium-ion hybrid ultracapacitors electrically connected in parallel; wherein the plurality of energy storage cells is coupled to a battery management system operable to selectively access a portion of the plurality of energy storage cells based at least in part on a measured parameter of the plurality of energy storage cells; and wherein the plurality of energy storage cells is electrically coupled to a charger to thereby charge the plurality of lithium-ion hybrid ultracapacitors.

In some aspects, the techniques described herein relate to an energy storage bank, wherein the energy storage bank is electrically coupled to a power factor correction component that converts alternating current power to direct current power for charging the energy storage bank.

In some aspects, the techniques described herein relate to an energy storage bank, wherein the plurality of energy storage cells is coupled to at least one fuse.

In some aspects, the techniques described herein relate to an energy storage bank, wherein the plurality of energy storage cells are operable to enter a hibernation state responsive to a signal from the battery management system.

In some aspects, the techniques described herein relate to an energy storage system including: an energy storage system housing; an energy storage bank disposed in the energy storage system housing, the energy storage bank including a plurality of energy storage cells, each energy storage cell of the plurality of energy storage cells including: a plurality of lithium-ion hybrid ultracapacitors; a battery management system disposed on or in the energy storage system housing and coupled to the plurality of lithium-ion hybrid ultracapacitors and operable to selectively access a portion of the plurality of lithium-ion hybrid ultracapacitors based at least in part on a measured parameter of the plurality of lithium-ion hybrid ultracapacitors; a charger electrically coupled to the plurality of lithium-ion hybrid ultracapacitors to thereby charge the plurality of lithium-ion hybrid ultracapacitors; and a power factor correction component that converts alternating current power to direct current power within the energy storage system.

In some aspects, the techniques described herein relate to an energy storage system, wherein the charger includes a flyback converter that is configured to measure a voltage output value and a current output value of the energy storage system.

In some aspects, the techniques described herein relate to an energy storage system, wherein the plurality of energy storage cells is electrically connected in series.

In some aspects, the techniques described herein relate to an energy storage system, wherein the plurality of lithium-ion hybrid ultracapacitors within each respective energy storage cell is electrically connected in parallel.

In some aspects, the techniques described herein relate to an energy storage system, further including: one or more fans disposed in the energy storage system housing, wherein the one or more fans are selectively operated based on a signal from the battery management system.

In some aspects, the techniques described herein relate to an energy storage system, wherein the energy storage system housing includes a plurality of openings providing an air flow path through the energy storage system housing to thereby dissipate heat from the energy storage system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
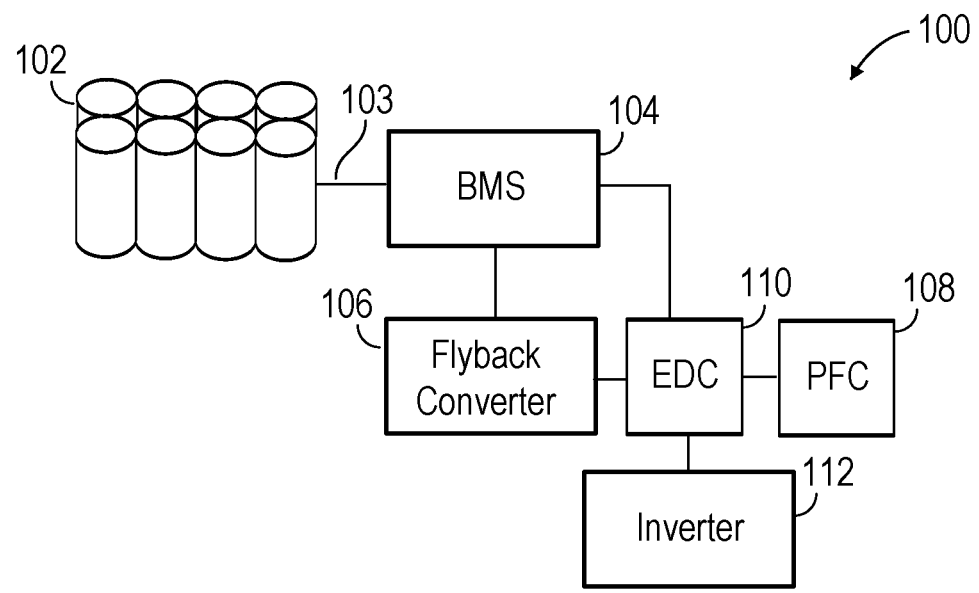
FIG. 1 depicts an exemplary energy storage system relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aspects of the present disclosure provide an energy storage bank including one or more hybrid capacitor cells for storing electrical energy as both electrostatic potential and electrochemical potential. For example, a plurality of lithium-ion hybrid capacitors may be disposed within the energy storage bank for storing electrical energy to power one or more external electronic devices. The hybrid capacitors described herein are suitable for a wider range of operating temperatures as compared with traditional chemical batteries. Further, the hybrid capacitors are suitable for a higher number of charge cycles compared to traditional batteries. Further still, an anode of the hybrid capacitors may be pre-doped with lithium ions to thereby lower an electrical potential of the anode, thereby exhibiting a relatively higher output voltage as compared to a traditional capacitor or other form of ultracapacitor that is not hybrid.

A battery management system is coupled to the energy storage bank to monitor one or more parameters associated with the hybrid capacitor cells. By monitoring and controlling the current provided and consumed from the energy storage bank via the battery management system, the overall useful life of the energy storage bank is increased and monitored over time. This provides an advantage over existing batteries storage systems in which the batteries typically only last a few years and cannot be extended by monitoring and controlling the current. For example, embodiments are contemplated in which the battery management system is operable to shut the energy storage bank down responsive to detecting an overcurrent to thereby protect the energy storage cells. Further, in some applications of the present disclosure, where providing power may be critical for a particular application, such as a critical medical system, the battery management system still continues to allow the energy storage bank to operate through an over current, but logs the over current event into a memory storage to indicate a life decreasing event of the energy storage bank. Accordingly, the battery management system is operable to protect the energy storage bank, as well as to monitor the useful life and predict an end of life based on operational parameters of the energy storage bank over time.

FIG. 1 depicts an exemplary energy storage system 100 relating to some embodiments. In some such embodiments, the energy storage system 100 is used in any of a variety of applications such as a wind turbine, a communications tower, an electric vehicle, a medical device, or other electric device, as well as other similar and unrelated energy storage applications. For example, embodiments are contemplated in which the energy storage system described herein may be included in a pitch energy system of a wind turbine to store energy for an emergency pitch energy event. However, it should be understood that embodiments are contemplated in which the energy storage system may be applied with a variety of different applications not explicitly described herein. In some embodiments, the energy storage system 100 is used as an uninterruptable power supply (UPS) to provide an uninterruptable power for one or more power consuming devices. For example, the energy storage system 100 may be used as a backup power source in the event of power loss or another interruption to a primary power source.

The energy storage system 100 includes an energy storage bank 102. In some embodiments, the energy storage bank 102 comprises a plurality of energy storage cells. For example, in some such embodiments, each cell of the plurality of energy storage cells includes one or more hybrid capacitors. The hybrid capacitors or hybrid ultracapacitors (e.g., hybrid supercapacitors), as described herein, may include lithium-ion hybrid ultracapacitors, which portray aspects of both capacitors and lithium-ion batteries. As such, the hybrid capacitors may take advantage of a combination of features associated with capacitor-based and battery-based energy storage techniques by combining electrostatic energy storage with electrochemical energy storage.

In some embodiments, use of the lithium-ion hybrid ultracapacitors extends the overall life cycle of the energy storage system 100 as compared to systems containing standard capacitors or ultracapacitors. Additionally, the lithium-ion hybrid ultracapacitors are better suited for extended operation at lower voltage operation. Additionally, the lithium-ion hybrid ultracapacitors are suitable over a wider range of voltages as compared to traditional electrostatic or electrochemical storage techniques, such as, capacitors or batteries. For example, the lithium-ion hybrid ultracapacitors are able to provide consistently reliable operation for both low voltage and high voltage applications.

Further, in some embodiments, the plurality of energy storage cells further comprises one or more batteries or other energy storage devices included in addition to the hybrid capacitors, such as, for example, standard capacitors and ultracapacitors that are not hybrid.

The energy storage system 100 additionally includes a battery management system (BMS) 104 coupled to the energy storage bank 102. The BMS 104 may be configured to monitor one or more parameters associated with the energy storage bank 102 and provide control and energy allocation within the energy storage bank 102. In some embodiments, the BMS 104 includes at least one processor for processing computer-readable instructions and information received at the BMS 104. Additionally, or alternatively, embodiments are contemplated in which the BMS 104 operates, at least in part, using passive techniques. For example, one or more field effect transistors (FETs) or other types of transistors may be used to control the energy storage bank 102 based on a particular voltage or current received at the BMS 104.

In some embodiments, a charger is included within the energy storage system 100. The charger may include a flyback converter 106 coupled to either or both of the energy storage bank 102 and the BMS 104. For example, the flyback converter 106 may be electrically coupled to the energy storage bank 102. In some such embodiments, the flyback converter 106 is configured to thereby charge one or more portions of the energy storage bank 102. For example, a plurality of lithium-ion hybrid ultracapacitors may be electrically charged using the flyback converter 106. Further, in some embodiments, operation of the flyback converter 106 may be controlled based at least in part on a feedback signal. For example, the flyback converter 106 may be controlled as a function of current regulation and/or voltage regulation.

In some embodiments, a power factor correction (PFC) component 108 is included in the energy storage system 100. The PFC component 108 may include a plurality of diodes, inductors, and other electronics operable to convert an AC current input to a DC current output. The PFC component 108 is operable to rectify a charging current for the energy storage system 100. For example, the PFC component 108 may rectify the current by converting an alternating current input into a direct current output. In some embodiments, the PFC component 108 is configured to output a first direct current to the flyback converter 106 for charging the energy storage bank 102 and a second direct current to an inverter or power output of the energy storage system 100.

In some embodiments, the energy storage system 100 further includes a display, for example, an LED display or the like for displaying operation parameters and other status data associated with the energy storage system 100. For example, in some embodiments, information indicative of the charge capacity of the energy storage bank 102 may be displayed on the display.

The energy storage system 100 may further include an energy distribution circuit (EDC) 110. For example, the energy distribution circuit 110 may comprise a printed circuit board electrically coupled to the energy storage bank 102 for controlling distribution of the energy stored by the energy storage bank 102. The energy storage system 100 comprises at least one microcontroller. The energy distribution circuit 110 may further be communicatively coupled to other components of the energy storage system 100 such as any of the BMS 104, the flyback converter 106, and the PFC component 108 or other circuit boards of the energy storage system 100. Accordingly, the energy distribution circuit 110 is operable to measure and process one or more parameters of the system 100 such as any of voltage, current, and faults, for example, using one or more comparators coupled to the at least one microcontroller. The energy distribution circuit 110 may further communicate these measured parameters to other components of the energy storage system 100. For example, in some embodiments, one or more fault lights disposed on an exterior portion of a housing associated with the energy storage system 100 is activated based on a fault detected by the energy distribution circuit 110.

In some embodiments, the energy storage system 100 further comprises an inverter 112, as shown, for inverting a DC output of the PFC component 108 or energy storage bank 102 back to AC power. However, in some embodiments, where AC power output is not needed by the power consuming device, the inverter 112 is not included.

In some embodiments, at least a portion of the components of the energy storage system 100 are disposed in a housing. For example, the energy storage bank 102 and the BMS 104 may be disposed in an energy storage housing. Further, in some embodiments, all of the components may be disposed in a single housing, such as the energy storage bank 102, the 104, the flyback converter 106, the PFC component 108, and the energy distribution circuit 110 may disposed in a housing. Further still, embodiments are contemplated in which a first portion of components is disposed in a first housing while a second portion of components are disposed in a second housing. For example, any of the energy storage bank 102 and the BMS 104 may be disposed in a first housing while any of the flyback converter 106, the PFC component 108, and the energy distribution circuit 110 are disposed in a second housing distinct from the first housing.

Embodiments are contemplated in which multiple instances of at least some of the components described above. For example, in some embodiments, a plurality of separate energy storage banks are included. Here, for example, the plurality of energy storage banks may be electrically connected in parallel and electrically coupled to the EDC 110. Accordingly, the EDC 110 is operable to transmit power and other signals to and from the plurality of EDC 110.

Figure 2:
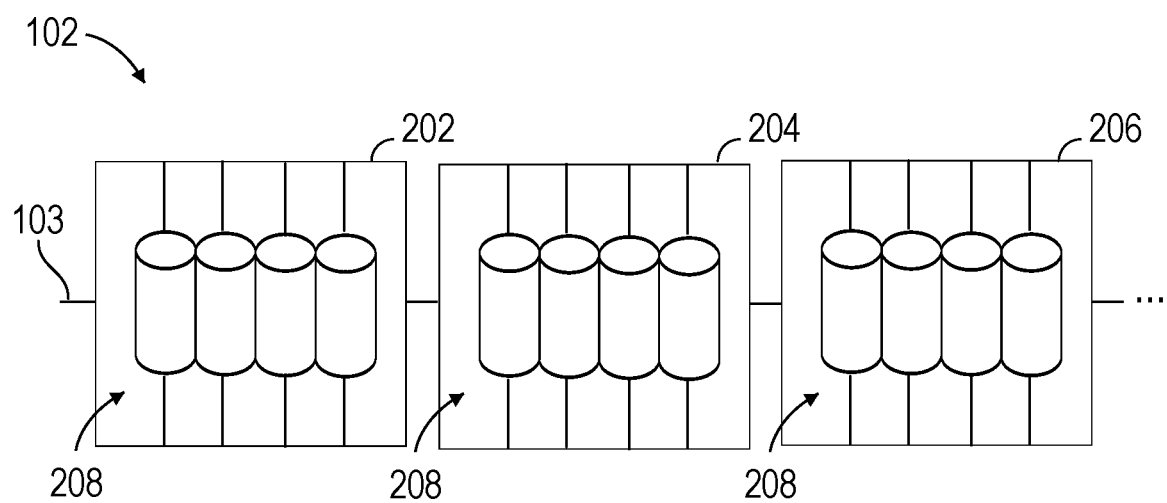
FIG. 2 depicts an exemplary arrangement of the energy storage bank relating to some embodiments.

FIG. 2 depicts an exemplary arrangement of the energy storage bank 102 relating to some embodiments. Here, the energy storage bank 102 includes one or more energy storage cells, such as, for example, a first energy storage cell 202, a second energy storage cell 204, and a third energy storage cell 206. In some such embodiments, the first energy storage cell 202, the second energy storage cell 204, and the third energy storage cell 206 are electrically connected in series to thereby increase the voltage with each successive energy storage cell. It should be understood, however, that additional energy storage cells may be included in the energy storage bank 102. For example, in some embodiments, seventeen energy storage cells are included electrically connected in series. Further, in some embodiments, other suitable quantities of energy storage cells are contemplated, such as, for example, three, four, ten, twenty, thirty-four, or some other number. Further still, embodiments are contemplated in which the number of cells may be selectively adjusted to meet power requirements of specific applications.

In some embodiments, each of the first energy storage cell 202, the second energy storage cell 204, and the third energy storage cell 206 comprises a plurality of lithium-ion hybrid ultracapacitors 208. In some such embodiments, the plurality of lithium-ion hybrid ultracapacitors 208 are electrically connected in parallel within each respective cell to thereby increase the energy capacity of the cell. For example, in some embodiments, the plurality of lithium-ion hybrid ultracapacitors 208 comprises four lithium-ion hybrid ultracapacitors connected in parallel. However, it should be understood that, in some embodiments, different numbers of ultracapacitors and arrangements of ultracapacitors within the cells are contemplated. For example, in some embodiments, the first energy storage cell 202 may include a different number of ultracapacitors than the second energy storage cell 204. Further, in some embodiments, a portion of the plurality of lithium-ion hybrid ultracapacitors 208 may be arranged in parallel with another portion arranged in series.

Figure 3A:
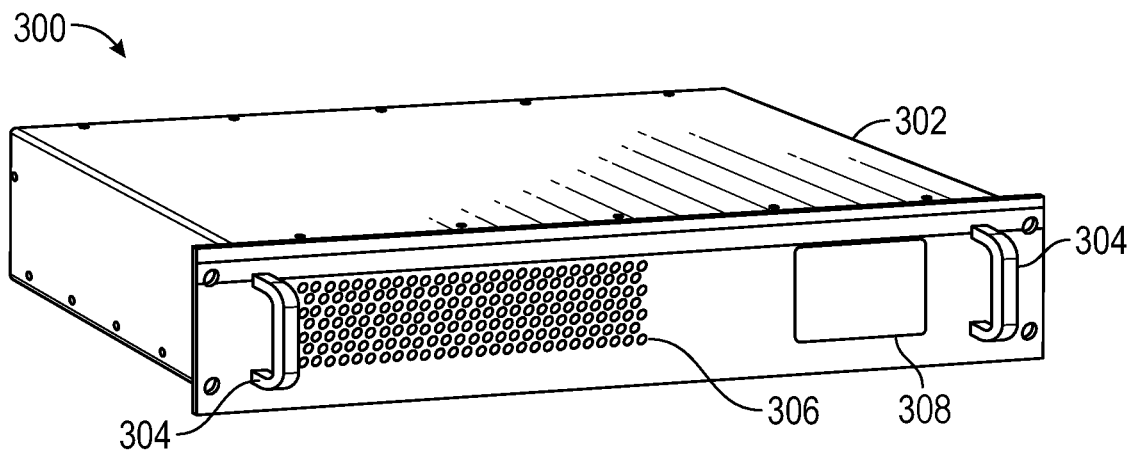
FIG. 3A depicts an exemplary exterior view of the energy storage system relating to some embodiments.

FIG. 3A depicts an exemplary exterior view of an energy converter box 300 associated with the energy storage system 100 relating to some embodiments. The energy converter box 300 includes a housing 302, which may comprise a rigid covering that supports and provides protection to an internal portion of the energy converter box 300. In some embodiments, one or more handles 304 may be disposed on the 302, as shown, for easily carrying the energy converter box 300. Additionally, a plurality of openings 306 may be included on the housing 302 for providing cooling by allowing air flow into the internal portion of the energy converter box 300.

In some embodiments, any of the flyback converter 106, the PFC component 108, and the energy distribution circuit 110 are disposed in the energy converter box 300. The energy converter box 300 may be electrically and/or communicatively coupled to other components of the energy storage system 100. For example, the energy converter box 300 may be coupled via any of electrical cables, optical cables, and other suitable forms of communication and electrical power transmission.

In some embodiments, the energy converter box 300 further includes a display portion 308. The display portion 308, for example, may comprise an LED screen or other form of display element. For example, further embodiments are contemplated in which the display portion 308 comprises one or more lights configured to convey information about the energy storage system 100. For example, in some embodiments, one or more fault lights may be included that are activated based on a fault detected within the energy storage system 100. Similarly, embodiments are contemplated in which a fault notification may be displayed on an LED screen of the display portion 308.

Figure 3B:
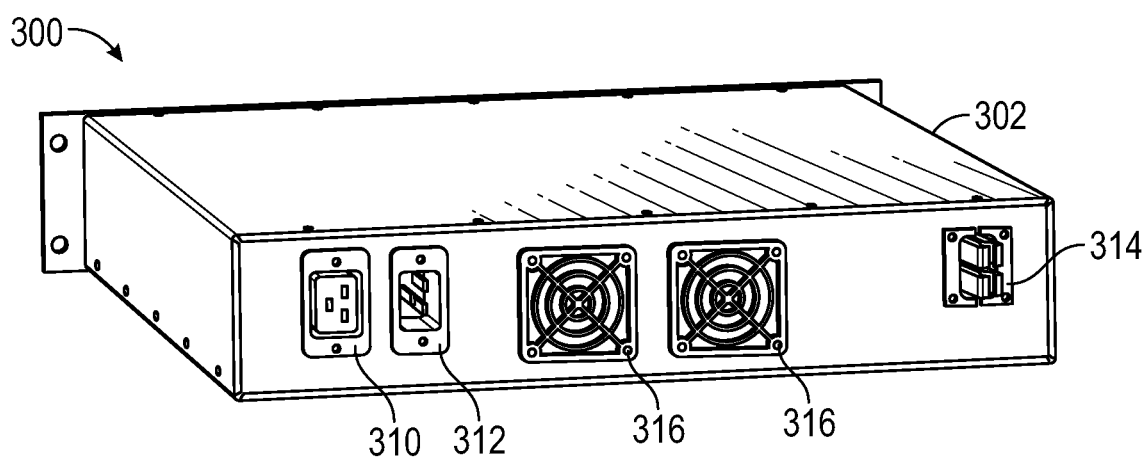
FIG. 3B depicts an exemplary exterior rear-side view of the energy storage system relating to some embodiments.

FIG. 3B depicts an exemplary exterior rear-side view of the energy converter box 300 relating to some embodiments. The energy converter box 300 may include one or more power ports such as an AC power output port 310, an AC power input port 312, and one or more DC power output ports 314.

In some embodiments, one or more fans 316 may be mounted on or in the housing 302, as shown, for providing cooling via forced airflow. In some such embodiments, the one or more fans 316 may be aligned with the plurality of openings 306 on an opposite side of the housing 302 such that air is drawn in from the fans 316 forced through the internal portion of the energy converter box 300 and released from the plurality of openings 306 to dissipate heat produced within the energy converter box 300.

Additionally, embodiments are contemplated in which the energy converter box 300 further comprises a display. For example, in some embodiments, an LED display may be disposed on an external surface of the housing 302 for displaying information indicative of one or more operation statuses or parameters of the energy storage system 100. In some embodiments, the display may include a graphical user interface (GUI) for displaying information and receiving inputs from an operator.

Figure 4:
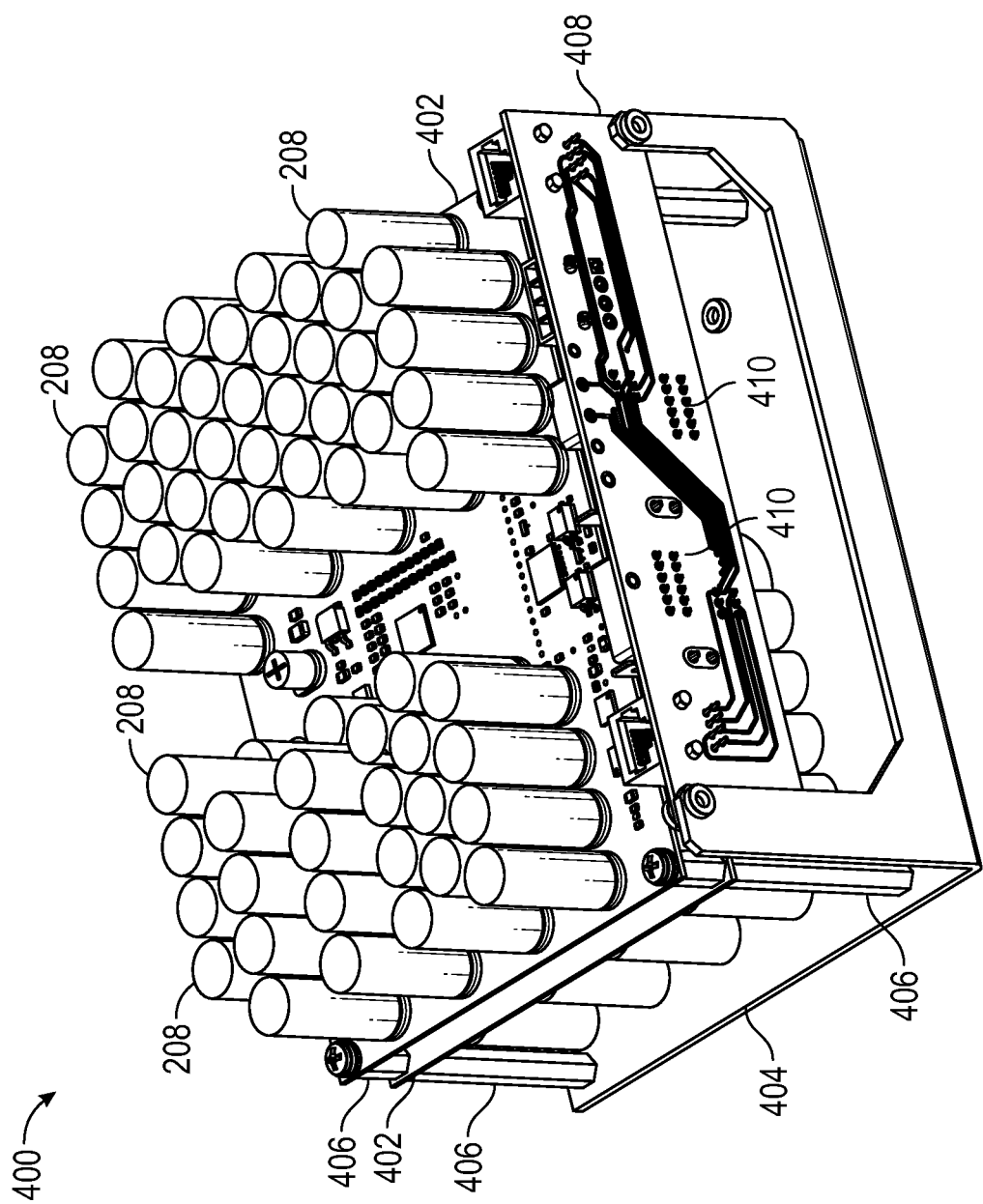
FIG. 4 depicts an exemplary internal view of the energy storage system relating to some embodiments.

FIG. 4 depicts an exemplary internal view of an energy storage box 400 associated with the energy storage system 100 relating to some embodiments. The energy storage box 400 may include the energy storage bank 102 and the BMS 104. The internal portion of the energy storage box 400 may be disposed within an external housing (not shown) to protect one or more internal components. In some embodiments, the energy storage box 400 includes one or more circuit boards 402. The circuit boards 402 may comprise printed circuit boards (PCBs), or other suitable electronic circuit boards such as a breadboard or the like. The circuit board 402 includes one or more circuit traces for transmitting power and/or information electronically to a plurality of components disposed on the circuit board 402. In some embodiments, one or more of the plurality of lithium-ion hybrid ultracapacitors 208 are disposed on and electrically coupled to the circuit board 402, as shown.

The plurality of lithium-ion hybrid ultracapacitors 208 may be coupled to the circuit board 402, for example, via soldering to the circuit board 402 along one or more circuit traces of the circuit board 402. Accordingly, electrical energy for powering and discharging the plurality of lithium-ion hybrid ultracapacitors 208 may be transmitted through the circuit traces. Additionally, information indicative of one or more parameters of the plurality of lithium-ion hybrid ultracapacitors 208 may be transmitted through the circuit board 402, such as, any of voltage, current, charge status, capacity, or other parameters associated with the plurality of lithium-ion hybrid ultracapacitors 208.

In some embodiments, a baseplate 404 may be included at a bottom of the internal portion of the energy storage box 400. The baseplate 404 may support at least a portion of the plurality of lithium-ion hybrid ultracapacitors 208 from below. In some embodiments, the one or more circuit boards 402 and the baseplate 404 may be supported and separated by a plurality of spacers 406. For example, the circuit board 402 and baseplate 404 may be bolted to the spacers 406 to hold the circuit board 402 and baseplate 404 in place and provide structural support. As such, the spacers 406 may include a rigid material such as aluminum, hard plastic, ceramic, rubber, or another suitable rigid material.

In some embodiments, an additional side-mounted circuit board 408 may be included within the internal portion of the energy storage box 400. In some embodiments, the side-mounted circuit board 408 includes a plurality of connection pins 410 configured to receive one or more port connections of the energy storage box 400. For example, the connection pins 410 may be coupled to any of the power ports mounted to the housing 302, such as the AC power output port 310, the 312, and the 314, as well as other ports, such as, a communications port or auxiliary port.

In some embodiments, the energy storage box 400 may be communicatively and electrically coupled to the energy converter box 300. For example, an ethernet cable may be included to provide a real-time communication connection between the energy storage box 400 and the energy converter box 300. Additionally, one or more electrical cables may be included to transmit electrical power between the energy storage box 400 and the energy converter box 300, for example, to charge the energy storage bank 102 or to discharge power from the energy storage bank 102.

In some embodiments, a plurality of separate energy storage modules are included, such as the energy storage box 400. For example, a number of energy storage boxes 400 may be coupled to a single energy converter box 300 such that the energy converter box 300 charges the energy storage boxes 400. In some such embodiments, the energy storage boxes 400 may be electrically connected in parallel to thereby increase a use time of the energy storage system 100.

Figure 5:
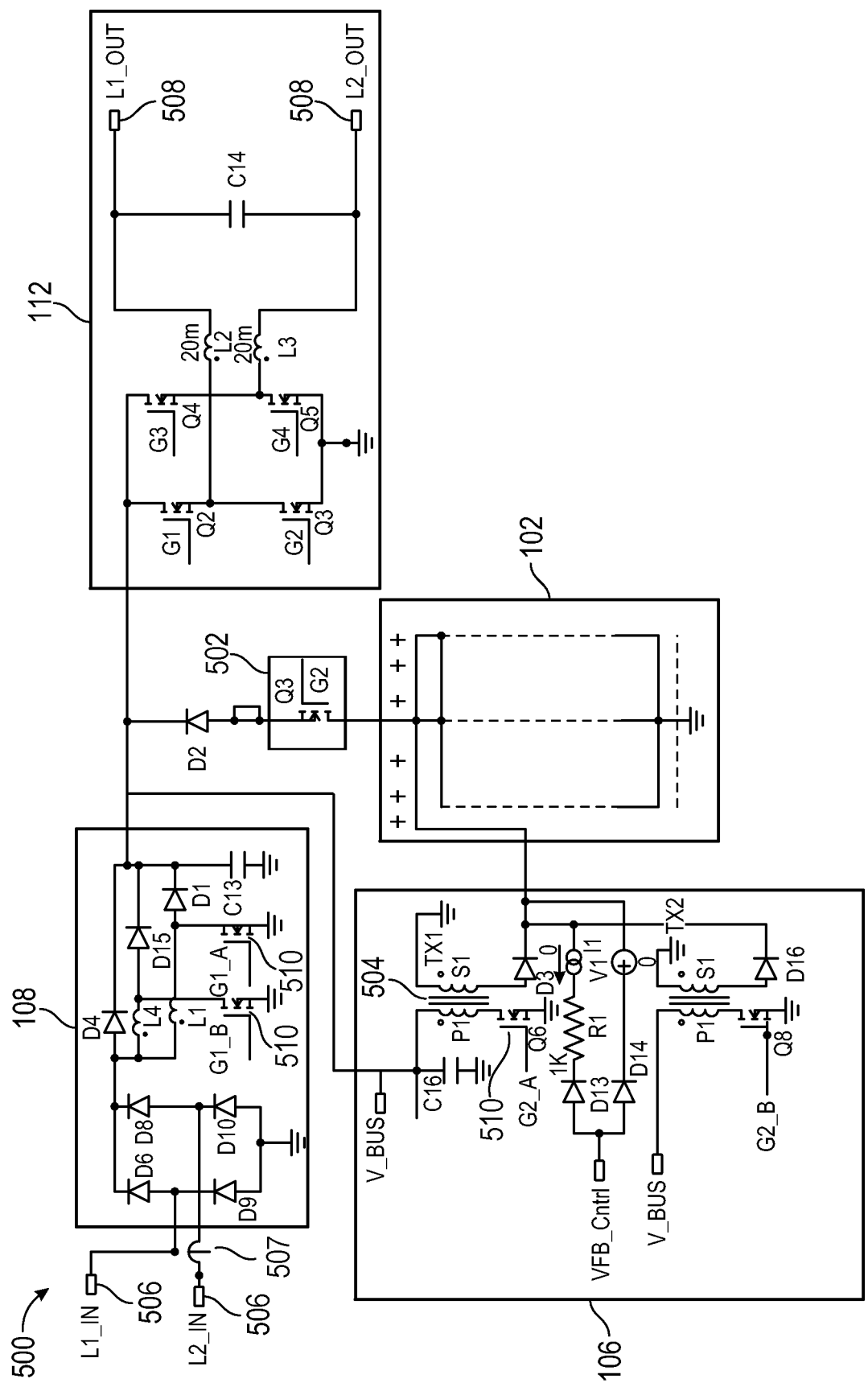
FIG. 5 depicts an exemplary circuit diagram of a circuit for the energy storage system relating to some embodiments.

FIG. 5 depicts an exemplary circuit diagram of a circuit 500 for the energy storage system 100 relating to some embodiments. The circuit 500 includes the energy storage bank 102, the flyback converter 106, the component 108, and the inverter component 112. In some embodiments, the flyback converter 106 comprises any of a one or more of diodes, one or more of capacitors, one or more inductors, one or more resistors, as well as one or more other electronic components. In some embodiments, a FET 502 is included in an electrical path between the energy storage bank 102, the PFC component 108, and the inverter component 112. The FET 502 may be operable to selectively connect and disconnect an output of the energy storage bank 102 based, for example, on a charge capacity of the energy storage bank 102 or another operation parameter of the energy storage system 100. In some embodiments, the flyback converter 106 includes an inductor split forming a transformer 504. The transformer 504 is configured to step-up or step-down the voltage in the circuit.

Further, in some embodiments, one or more thermal switches 510 may be coupled to the flyback converter 106. Similarly, one or more additional thermal switches 510 may be coupled to the PFC component 108. For example, embodiments are contemplated in which a first thermal switch is included and coupled to the flyback converter 106 and the second thermal switch is included and coupled to the PFC component 108. In some such embodiments, the one or more thermal switches 510 are configured to adjust operation of the circuit 500 based on a measured temperature. For example, embodiments are contemplated in which the thermal switches are used to prevent overheating by temporarily preventing charging operation of the energy storage system 100 based on a measured temperature above a predetermined threshold temperature value.

In some embodiments, one or more inputs 506 may be coupled to the PFC component 108. Accordingly, the PFC component 108 may be configured to receive alternative current (AC) power from the inputs 506. The PFC component 108 may include a plurality of diodes, transistors, capacitors, and inductors, as well as other electronic components. In some embodiments, the PFC component 108 is used to convert the AC power received at the inputs 506 into direct current (DC) power. The PFC component 108 may be further configured to adjust the current to bring the current into phase with the voltage to thereby increase the charging efficiency of the circuit.

In some embodiments, the inverter component 112 includes a plurality of transistors, inductors, and one or more capacitors. The inverter component 112 may further include one or more outputs 508. The inverter component 112 is configured to convert DC power from the energy storage bank 102 to AC power and output the AC power at outputs 508. In some embodiments, operation of the inverter component 112 is driven based at least in part on the energy storage bank 102. For example, in some embodiments, operation of the inverter component 112 is determined based on a charge capacity of the energy storage bank 102.

In some embodiments, the circuit 500 further includes at least one electrical breaker that permits low voltage operation of the energy storage system 100. For example, the electrical breaker may be configured to protect at least a portion of the circuit 500 from damage caused by overcurrent. Here, the electrical breaker may remove power from the circuit 500 in response to detection of a fault condition. In some embodiments, the fault condition may be determined based on a heat or magnetic effect outside of a safe operating threshold range.

In some embodiments, the circuit 500 further includes a spark gap or metal oxide varistor 507 that limits a surge voltage at the inputs 506 of the PFC component 108. Accordingly, the spark gap or metal oxide varistor 507 may be configured to prevent a surge voltage from the one or more power sources from damaging the circuit 500. Additionally, in some embodiments, one or more fuses may be included that are coupled to one or more energy storage cells of the energy storage bank 102. For example, embodiments are contemplated in which a fuse is coupled to each respective cell such that the fuse protects that cell from overcurrent.

In some embodiments, an emergency stop system may be included for the energy storage bank 102 to selectively disconnect electrical power of the energy storage bank in response to a manual operator input. Further, embodiments are contemplated in which the emergency stop system may be triggered automatically based on one or more measured parameters of the circuit 500 or a detected fault condition. For example, in some embodiments, the emergency stop system includes an emergency stop circuit including one or more cover interlocks disposed in the circuit and one or more cable interlocks disposed in the circuit.

In some embodiments, while AC power is available at the AC inputs 506, current may be provided directly to the inverter component 112. The circuit 500 may further comprise one or more diodes configured to passively switch operation such that power is received from the energy storage bank 102 responsive to loss of power at the AC inputs 506.

In some embodiments, any combination of passive and active control of the circuit 500 are contemplated. In some such embodiments, the BMS 104 is configured to automatically shut off power from the energy storage bank 102 responsive to determining that a voltage of the energy storage bank 102 has fallen below a predetermined voltage threshold. For example, a predetermined voltage threshold value of 260 volts (v) is contemplated such that a power connection from the energy storage bank 102 is disconnected responsive to determining that the voltage of the energy storage bank 102 is below 260 v. However, other suitable voltage thresholds are also contemplated and, in some embodiments, the specific voltage thresholds may be selected based at least in part on specific parameters of the system and the application thereof. Further, the BMS 104 is operable to activate or reconnect power from the energy storage bank 102 responsive to a determination that another predetermined voltage threshold value is reached. For example, BMS 104 may reactivate the power connection from the energy storage bank 102 responsive to determining that the voltage of the energy storage bank 102 is above a predetermined threshold value of 300 v. In some embodiments, this predetermined threshold value associated with allowing activation of the energy storage bank 102 may be selected relative to a full charge capacity of the energy storage bank 102. For example, the power from the energy storage bank 102 may be activated based on determining that the energy storage bank 102 is at least 50% of the total voltage, such that an energy storage bank with a total voltage of 600 v will be activated when the voltage reaches 300 v.

In some embodiments, a dry contact may be included in an electrical connection of the energy storage bank 102. For example, the dry contact may be disposed at an electrical connection between the energy distribution circuit 110 and the energy storage bank 102 and configured to measure a voltage of the energy storage bank 102. As such, one or more operations may be controlled based at least in part on the voltage signal measured at the dry contact. For example, in some embodiments, the energy storage bank 102 may be activated based on determining that the voltage measured at the dry contact is above a predetermined voltage threshold, such as 300 v.

Additionally, in some embodiments, a diagnostics system may be included on or coupled to the energy storage system 100. For example, the energy storage system 100 may be communicatively coupled to a mainframe or other control system via a serial connection or other standardized or non-standardized communication protocol. Accordingly, for example, the diagnostics system may determine a charge status or other information associated with the energy storage system 100 based on received signals indicative of one or more measured parameters of the energy storage system 100. In some such embodiments, the diagnostics system is operable to determine a health of the energy storage bank 102 or of individual cells of the energy storage bank 102. For example, an algorithm is contemplated that determines a "health" or useful life remaining of the energy storage bank 102 based at least in part on a measured voltage, current, resistance, or changes thereof, as well as other measured parameters associated with the energy storage system 100.

Figure 6:
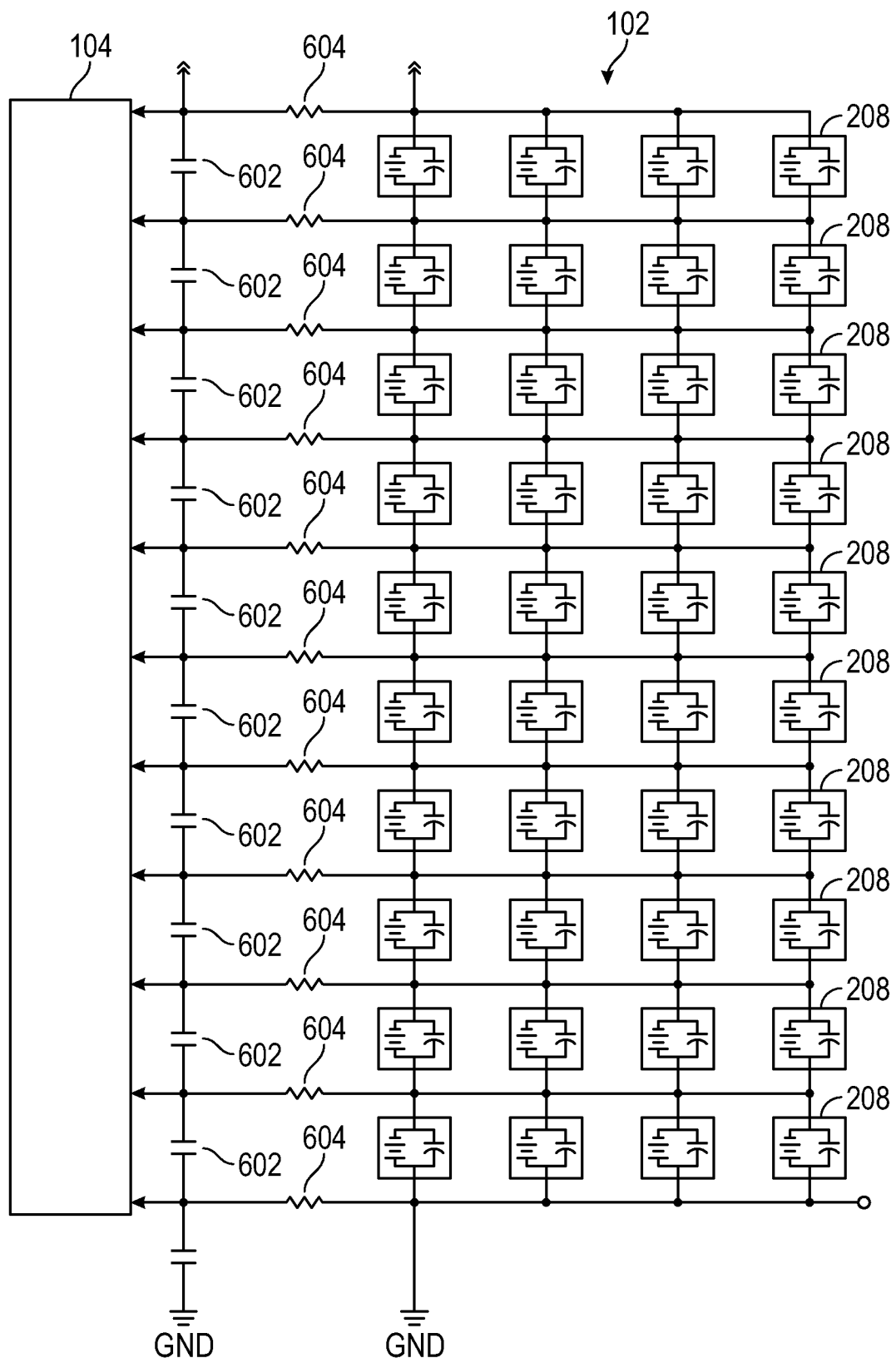
FIG. 6 depicts an exemplary circuit diagram of a circuit for the energy storage bank and BMS relating to some embodiments.

FIG. 6 depicts an exemplary circuit diagram of a circuit 600 for the energy storage bank 102 and BMS 104 relating to some embodiments. The circuit 600 includes the energy storage bank 102 and the BMS 104, which may be electrically coupled, as shown. In some embodiments, the energy storage bank 102 comprises the plurality of lithium-ion hybrid ultracapacitors 208, one or more capacitors 602, and one or more resistors 604. The capacitors 602 may be disposed within the circuit 600 in parallel with the connection with the BMS 104. The resistors 604 may be disposed along the electrical path to the plurality of lithium-ion hybrid ultracapacitors 208, as shown. In some embodiments, the plurality of lithium-ion hybrid ultracapacitors 208 may be arranged in parallel, as shown, to form a plurality of cells. For example, each cell of the energy storage bank 102 may comprise a string of four lithium-ion hybrid ultracapacitors electrically connected in parallel. In some embodiments, arranging the plurality of lithium-ion hybrid ultracapacitors 208 into separate cells allows portions of the energy storage bank 102 to be individually repairable. For example, if a particular cell has exceeded a useful life that cell may be individually replaced or repaired without removing or affecting the remaining cells.

In some embodiments, the BMS 104 is coupled to the energy storage bank 102 via a plurality of electrical connections 103 such that the BMS 104 is operable to determine one or more electrical parameters associated with portions of the plurality of lithium-ion hybrid ultracapacitors 208 or of each individual lithium-ion hybrid ultracapacitor. Further, in some embodiments, the BMS 104 is operable to selectively access a portion of the plurality of lithium-ion hybrid ultracapacitors 208. For example, the BMS 104 may access a particular portion based on the electrical parameters of the respective portion of lithium-ion hybrid ultracapacitors. In some embodiments, the portion may be selectively accessed by the BMS 104 based at least in part on a measured parameter of the plurality of lithium-ion hybrid ultracapacitors 208. For example, a particular portion or individual lithium-ion hybrid ultracapacitor may be selected based on a remaining charge capacity of the lithium-ion hybrid ultracapacitor or cell of lithium-ion hybrid ultracapacitors.

In some embodiments, the BMS 104 comprises a plurality of field-effect transistors (FETs). The FETs may be coupled to respective portions of the energy storage bank 102. For example, an individual FET may be coupled to each respective cell of the energy storage bank 102 to measure a parameter of the respective cell, such as for example, a current charge level of the cell. Accordingly, the BMS 104 may control operation of the energy storage system 100 based at least in part on the charge level within a particular cell of the energy storage bank 102. For example, in some embodiments, the BMS 104 may selectively access a particular cell such that power is provided at the outputs 508 from that particular cell.

Exemplary parameters of the energy storage system 100 will now be described relating to some embodiments. Here, an overall power of the energy storage system 100 is approximately 3 kilovolt amps (KVA). Similarly, an input voltage is approximately 230 v AC with an input voltage range of 160 v to 276 v, an input frequency of 50 to 60 Hz, an input power factor of approximately 0.95. An output voltage is one of 220 v, 230 v, or 240 v AC with a voltage tolerance of about plus or minus 3%.

Figure 7:
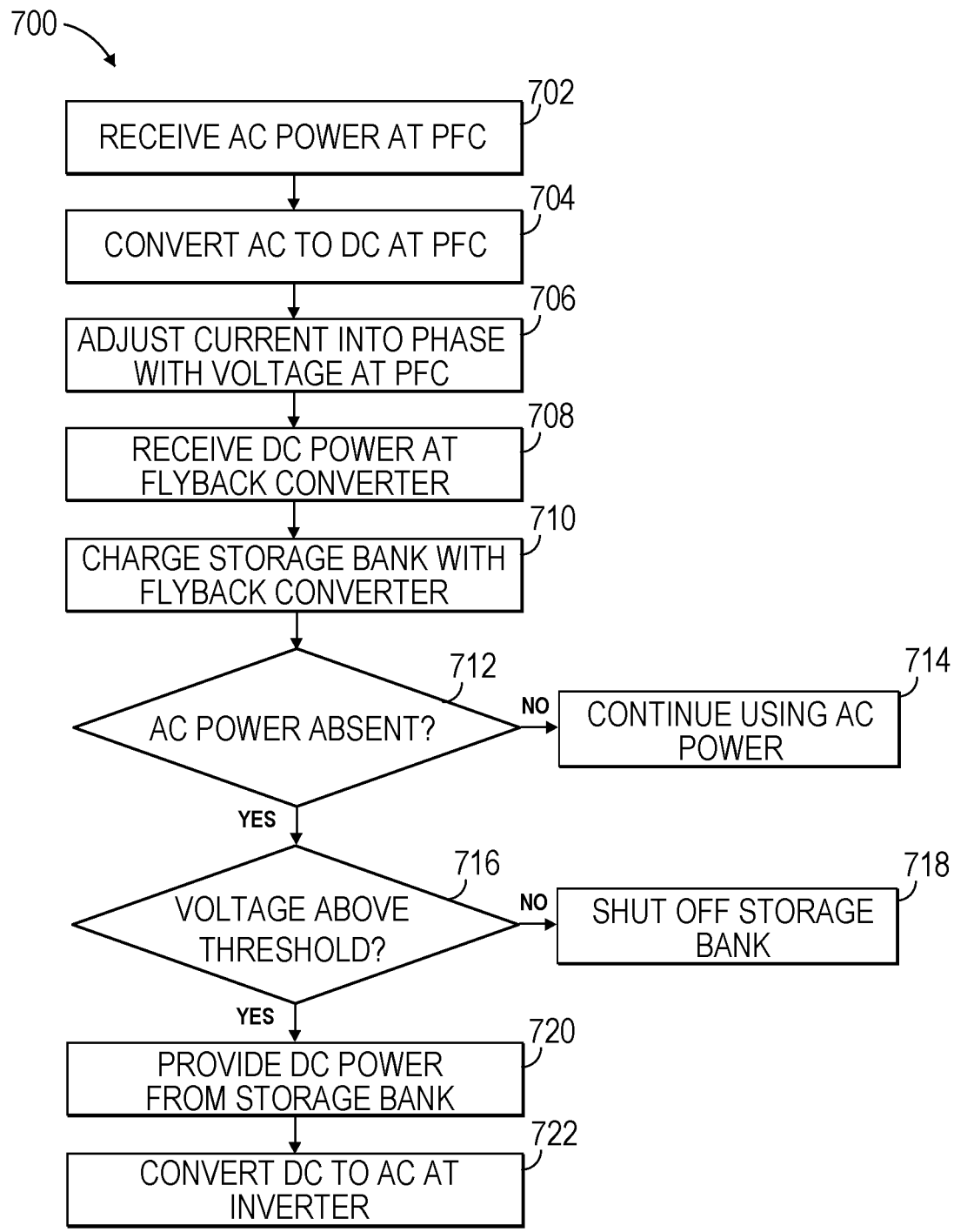
FIG. 7 depicts an exemplary method of operating the energy storage system relating to some embodiments.

FIG. 7 depicts an exemplary method 700 of operating the energy storage system 100 relating to some embodiments. In some embodiments, at least a portion of the steps described herein with respect to the method 700 may be carried out using at least one processor, for example, a processor of the BMS 104 and/or a processor of one or more other components of the energy storage system 100. The steps may be performed by executing a set of computer-readable instructions by the at least one processor. Further, in some embodiments, steps may be performed using a processor of a designated controller of the energy storage system 100. Additionally, or alternatively, at least a portion of the steps may be carried out using circuitry such as either of, or a combination of, the circuit 500 and the circuit 600. It should be understood that the steps described herein may be performed actively or passively. For example, in some embodiments, the circuitry may be arranged such that the electronics passively perform the steps described herein without active control from a processor or controller. Alternatively, in some embodiments, the steps may be carried out with active control. Further, embodiments are contemplated in which a first portion of steps is performed passively and a second portion of steps is performed actively.

At step 702, AC power is received at the PFC component 108. For example, AC power may be received at the inputs 506 from one or more energy sources. It should be understood that the one or more energy sources may include any form of suitable energy source capable of providing electrical power. For example, in some embodiments, the energy sources include any one of or combination of one or more solar panels, generators, and grid power sources.

At step 704, the PFC component 108 converts AC power to DC power. For example, 220 v AC may be received at the inputs 506 and rectified to 380 to 405 v DC provided to the flyback converter 106 and 275 to 410 v DC to the inverter 112. At step 706, the PFC component 108 adjusts the current into phase with the voltage of the circuit to thereby increase the charging efficiency of the energy storage system 100.

At step 708, DC power is received at a charger or at the flyback converter 106 of the charger. The DC power may be received through a direct electrical connection with the PFC component 108. In some embodiments, the charger is activated based on a FET switch. For example, the FET switch may be coupled to the PFC component 108 such that the charger (and flyback converter 106) is activated responsive to an output from the PFC component 108 indicative of an operation of the PFC component 108. At step 710, the flyback converter 106 charges the energy storage bank 102 using DC power. For example, the flyback converter 106 may receive the rectified DC current from the PFC 108 to charge the energy storage bank 102.

At step 712, a determination is made as to whether AC power is absent. For example, this determination may be made by the BMS 104 or the EDC 110, or another component of the energy storage system 100. In some embodiments, the determination may be made at least partially using passive means. For example, any of a diode or comparator may be used to determine whether AC power is available. If AC power is not absent (i.e., AC power is available) the process continues to step 714 where the system 100 continues to use the AC power source.

Alternatively, if AC power is absent (i.e., AC power is unavailable) the process continues to step 716. At step 716, another determination is made as to whether a voltage of the energy storage bank 102 is above a predetermined voltage threshold. As described above, the predetermined voltage threshold may be selected relative to a total charge voltage of the energy storage bank 102. For example, the predetermined voltage threshold may be set at approximately 50% of the total charge capacity. If the voltage is not above the threshold, the process continues to step 718 where the energy storage bank 102 is shut off or otherwise disconnected from a power output of the energy storage system 100. In some such embodiments, this step may be performed at least partially using passive means. For example, a diode or comparator in a path of the output from the energy storage bank 102 may be used to passively prevent the energy storage bank 102 from providing output current when the voltage is below the threshold.

If the voltage is above the predetermined voltage threshold, the process continues to step 720. At step 720, DC power is provided to the inverter component 112 from the energy storage bank 102. At step 722, the inverter component 112 is used to convert DC power to AC power. Said AC power may be provided to one or more power consuming devices. Accordingly, the energy stored within the energy storage bank 102 may be used to power said one or more power consuming devices.

In some embodiments, the BMS 104 is operable to monitor various parameters of the energy storage bank 102 over time to increase a lifetime and predict an end of life of the energy storage bank 102. For example, the BMS 104 may monitor a current going in and out of the energy storage bank 102 and log over current events in a memory storage associated with the BMS 104. In some embodiments, the BMS 104 is operable to disconnect one or more power connections of the energy storage bank 102 responsive to detecting an over current. Further, the BMS 104 may log overcurrent events and other lifetime decreasing events into the memory storage to predict an end of life of the energy storage bank 102 based on said events. Further still, in some embodiments, the BMS 104 is operable to place the energy storage bank 102 into a hibernation state based on any of a measured parameter or an operator input. For example, the BMS 104 may enter a hibernation state while not in use or when the energy storage bank 102 does not include enough charge to provide power. Here, a minimum charge capacity threshold is contemplated that indicates a level of charge at which the BMS 104 and energy storage bank 102 are activated out of the hibernation state to continue providing power.

Although the invention has been described with reference to the embodiments illustrated in the attached drawing figures, it is noted that equivalents may be employed and substitutions made herein without departing from the scope of the invention as recited in the claims.

The invention claimed is:

1. An energy storage system comprising:
an energy storage system housing;
a plurality of lithium-ion hybrid ultracapacitors disposed in the energy storage system housing;

a battery management system coupled to the plurality of lithium-ion hybrid ultracapacitors and operable to selectively access a portion of the plurality of lithium-ion hybrid ultracapacitors based at least in part on a measured parameter of the plurality of lithium-ion hybrid ultracapacitors, wherein, in response to an overcurrent, the battery management system is configured to cause a logging of an event associated with the overcurrent into a memory associated with the battery management system, the logging of the event for predicting an end of life of the plurality of lithium-ion hybrid ultracapacitors, wherein if alternating current (AC) power is unavailable and a voltage of the plurality of lithium-ion hybrid ultracapacitors is above a predetermined voltage threshold, direct current (DC) power is provided from the plurality of lithium-ion hybrid ultracapacitors, wherein the battery management system and the plurality of lithium-ion hybrid ultracapacitors are operable to be placed into a hibernation state responsive to the energy storage system having a charge below a minimum charge threshold, and wherein the battery management system and the plurality of lithium-ion hybrid ultracapacitors are further operable to be activated out of the hibernation state responsive to the plurality of lithium-ion hybrid ultracapacitors having charge above the minimum charge threshold; and a charger electrically coupled to the plurality of lithium-ion hybrid ultracapacitors to thereby charge the plurality of lithium-ion hybrid ultracapacitors.

2. The energy storage system of claim 1, further comprising:
a power factor correction component that converts alternating current power to direct current power within the energy storage system.

3. The energy storage system of claim 2, wherein the charger comprises a flyback converter, the energy storage system further comprising:
a first thermal switch coupled to the flyback converter; and
a second thermal switch coupled to the power factor correction component.

4. The energy storage system of claim 2, further comprising:
a metal oxide varistor that limits a surge voltage at an electrical input of the power factor correction component.

5. The energy storage system of claim 1, further comprising:
one or more printed circuit boards disposed within the energy storage system housing coupled to the plurality of lithium-ion hybrid ultracapacitors, wherein each of the plurality of lithium-ion hybrid ultracapacitors is soldered to the one or more printed circuit boards.

6. The energy storage system of claim 1, wherein the plurality of lithium-ion hybrid ultracapacitors comprises seventeen lithium-ion hybrid ultracapacitor cells electrically connected in series, each lithium-ion hybrid ultracapacitor cell of the seventeen lithium-ion hybrid ultracapacitor cells comprising a string of four lithium-ion hybrid ultracapacitors electrically connected in parallel.

7. The energy storage system of claim 1, further comprising:
one or more fans disposed on the energy storage system housing that provide cooling to an internal portion of the energy storage system.

8. The energy storage system of claim 1, wherein the battery management system is disposed on or in the energy storage system housing.

9. The energy storage system of claim 1, wherein the charger is disposed in a separate housing distinct from the energy storage system housing.

10. An energy storage bank comprising:
a plurality of energy storage cells electrically connected in series, each energy storage cell of the plurality of energy storage cells comprising:
a plurality of lithium-ion hybrid ultracapacitors electrically connected in parallel; and
a plurality of electrical connections that couples the plurality of energy storage cells to a battery management system that is operable to selectively access a portion of the plurality of energy storage cells based at least in part on a measured parameter of the plurality of energy storage cells; and
wherein the plurality of energy storage cells is electrically coupled to a charger to thereby charge the plurality of lithium-ion hybrid ultracapacitors,
wherein, in response to an overcurrent, the energy storage bank is configured to cause a logging of an event associated with the overcurrent into a memory associated with the battery management system, the logging of the event for predicting an end of life of the plurality of lithium-ion hybrid ultracapacitors,
wherein if alternating current (AC) power is unavailable and a voltage of the energy storage bank is above a predetermined voltage threshold, direct current (DC) power is provided from the energy storage bank,
wherein the battery management system and the energy storage bank are operable to enter a hibernation state responsive to the battery management system detecting that a charge of the plurality of energy storage cells below a minimum charge threshold, and
wherein the battery management system and the energy storage bank are operable to be activated out of the hibernation state responsive to the battery management system detecting that the charge of the plurality of energy storage cells above the minimum charge threshold.

11. The energy storage bank of claim 10, wherein the energy storage bank is electrically coupled to a power factor correction component that converts alternating current power to direct current power for charging the energy storage bank.

12. The energy storage bank of claim 11, wherein the plurality of energy storage cells is coupled to at least one fuse.

13. An energy storage system comprising:
an energy storage system housing;
an energy storage bank disposed in the energy storage system housing, the energy storage bank comprising a plurality of energy storage cells, each energy storage cell of the plurality of energy storage cells comprising:
a plurality of lithium-ion hybrid ultracapacitors;
a battery management system disposed on or in the energy storage system housing and coupled to the plurality of lithium-ion hybrid ultracapacitors and operable to selectively access a portion of the plurality of lithium-ion hybrid ultracapacitors based at least in part on a measured parameter of the plurality of lithium-ion hybrid ultracapacitors,
wherein, in response to an overcurrent, the battery management system is configured to cause a logging of an event associated with the overcurrent into a memory associated with the battery management system, the logging of the event for predicting an end of life of the plurality of lithium-ion hybrid ultracapacitors, wherein the battery management system and the energy storage bank are operable to be placed into a hibernation state responsive to the energy storage bank having a charge below a minimum charge threshold, and wherein the battery management system and the energy storage bank are further operable to be activated out of the hibernation state responsive to the energy storage bank having charge above the minimum charge threshold;

a charger electrically coupled to the plurality of lithium-ion hybrid ultracapacitors to thereby charge the plurality of lithium-ion hybrid ultracapacitors; and a power factor correction component that converts alternating current power to direct current power within the energy storage system.

14. The energy storage system of claim 13, wherein the charger comprises a flyback converter that is configured to measure a voltage output value and a current output value of the energy storage system.

15. The energy storage system of claim 13, wherein the plurality of energy storage cells is electrically connected in series.

16. The energy storage system of claim 15, wherein the plurality of lithium-ion hybrid ultracapacitors within each respective energy storage cell is electrically connected in parallel.

17. The energy storage system of claim 13, further comprising:
one or more fans disposed in the energy storage system housing,
wherein the one or more fans are selectively operated based on a signal from the battery management system.

18. The energy storage system of claim 13, wherein the energy storage system housing comprises a plurality of openings providing an air flow path through the energy storage system housing to thereby dissipate heat from the energy storage system.

19. The energy storage system of claim 13, wherein if alternating current (AC) power is unavailable and a voltage of the energy storage bank is above a predetermined voltage threshold as determined by the battery management system, direct current (DC) power is provided from the energy storage bank.

20. The energy storage system of claim 13, wherein the battery management system comprises a plurality of field-effect transistors.

* * * * *